Nov. 10, 1925.
E. WALKER
1,561,039
SPRAYING APPARATUS
Filed Nov. 11, 1924
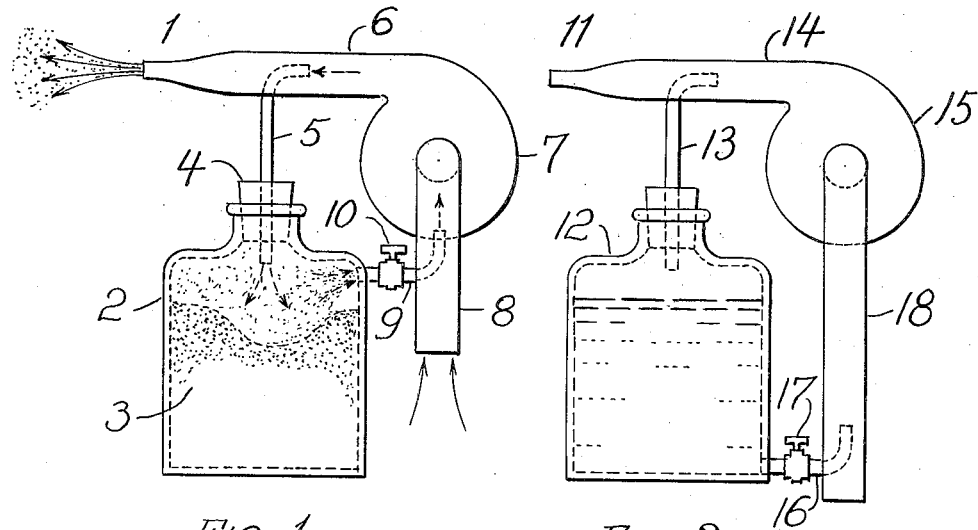

Patented Nov. 10, 1925.

1,561,039

UNITED STATES PATENT OFFICE.

EDWARD WALKER, OF GRANTWOOD, NEW JERSEY.

SPRAYING APPARATUS.

Application filed November 11, 1924. Serial No. 749,185.

*To all whom it may concern:*

Be it known that I, EDWARD WALKER, citizen of the United States, residing at Grantwood, in the county of Bergen and State of New Jersey, have invented certain new and useful Improvements in Spraying Apparatus, of which the following is a specification.

My invention relates to an apparatus especially adapted for the spraying of atomized liquids, powders and antiseptics for the purpose of eliminating vermin, germs, insects and other parasites.

The invention has for its object to entirely break up the matter to be sprayed and shoot it entrained in a high velocity air current from a nozzle in a highly atomized state.

It has also for its object to provide simple and inexpensive means readily attachable to an ordinary electrically driven fan.

Further my invention has for its object to insert an open pipe inside the fan discharge turned against the flow, so that a proper part of the fan discharge current will be utilized for the building up of pressure inside said open pipe, which will transmit the pressure to the container in which the matter to be sprayed is stored.

Further the invention has for an object to provide a tube or pipe inside the suction pipe of the fan, said pipe to be parallel with the fan flow so that the air current will cause a vacuum inside the pipe which vacuum is applied so as to suck the matter to be sprayed out of the container.

Finally my invention has for its object to provide means for regulating the quantities of matter to be sprayed, which is of the greatest importance where powerful disinfectants are being used.

In the drawing:—

Figure 1 shows in a diagrammatical way a sprayer adapted for the spraying of powder or a liquid when the velocity of the air stream is sufficient.

Figure 2 shows a sprayer adapted for the spraying of a liquid disinfectant or germicide.

Referring to the drawing in which like reference characters designate corresponding parts, 1 designates the sprayer shown in Figure 1, which sprayer is adapted for the spraying of powdered matter.

This sprayer comprises the bottle shaped container 2 in which the powder 3 is placed.

Through the cork or rubber plug 4, a pipe 5 is inserted and the upper end of said pipe is projected into the discharge duct 6 of the electrically driven fan 7. A fan suction pipe 8 has one end connected to the center of the fan casing so that the material drawn through said pipe will be discharged into the center of the fan rotor and thus be thoroughly atomized before entering the duct 6.

The upper end of the pipe 5 is bent and directed as shown in the drawing so as to catch a part of the air current issuing from the fan.

The fan suction pipe 8 is also provided with a similar bent pipe 9 which is connected to the bottle shaped container 2 adjacent its top, and said pipe is supplied with the regulating cock 10.

The sprayer 11 shown in Figure 2, which sprayer is adapted for the spraying of liquid disinfectants, also comprises a container 12, a bent pipe 13 leading from the top of the container to the fan discharge 14, the electrically driven fan 15, a bent pipe 16 provided with the regulating cock 17 and leading from the bottom of the container 12 to the fan suction pipe 18.

The mode of operation and action is practically the same for the different types of apparatus and is as follows:

The fan having been started will create an air stream through the system. Part of this stream will be deviated into the containers through the bent pipes which are turned in the direction from whence the flow or blast of air is coming and will there develop a pressure which tends to force out the material through the bent pipes which are turned in the opposite direction from the first named pipes.

Simultaneously the vacuum created in the second mentioned bent pipes will assist the pressure in abstracting and discharging the matter to be sprayed from the containers.

It is to be noted that a regulating valve or cock is only necessary on the discharge pipe.

Referring to Figure 1, the arrows show the direction of air flow, and the drawing indicates in a diagrammatical way how the air inrush into the container sets up a cyclone above the surface of the powder, which subsequently is picked up by the cyclone and suspended therein as a cloud before leaving the container.

It is also to be noted that in the liquid sprayers the liquid emanating from the discharge pipe will be picked up by the high velocity air stream and broken up in a fine spray suspended in the air stream.

In the sprayer types shown in Figures 1 and 2 the fan itself will still further break up the spray when it passes through the speedily revolving fan vanes.

In the sprayers disclosed the parts are shown rigidly connected together, but the container as well as the fan may be connected together by flexible hose so that the operator can conveniently carry the apparatus and direct the nozzle in a proper manner.

Therefore I do not desire to be understood as limiting myself to the specific details of construction and arrangement as it is manifest that variations and modifications may be made in the adaptation of the device to various conditions, without departing from the spirit and scope of my invention.

I claim:

1. In a spraying apparatus, an air fan having a casing, a duct into which a current of air is injected by said fan, means for deviating a part of said current from said duct into a container to create a pressure therein and to agitate a substance within said container, a suction conduit connected to the center of said fan casing and in alignment with the axis of the fan rotor, and means for establishing communication between said container and said conduit so that the substance in said container may be conveyed to said conduit under the influence of the suction in the latter to cause the passage of said substance into the center of the fan rotor and from thence outwardly into said duct.

2. In a spraying apparatus, an air fan having a casing, a duct into which a current of air is injected by said fan, means for deviating a part of said current from said duct into a container to create a pressure therein and to agitate a substance within said container, a suction conduit connected to the center of said fan casing and in alignment with the axis of the fan rotor, means for establishing communication between said container and said conduit so that the substance in said container may be conveyed to said conduit under the influence of the suction in the latter to cause the passage of said substance into the center of the fan rotor and from thence outwardly into said duct, and means for regulating the flow of the substance through said conveying means.

EDWARD WALKER.